United States Patent
Steen et al.

(10) Patent No.: US 7,270,624 B2
(45) Date of Patent: Sep. 18, 2007

(54) DRIVING UNIT FOR MOTOR VEHICLE AND METHOD FOR DETERMINING THE CHARACTERISTIC OF A COUPLING OF THE DRIVING UNIT

(75) Inventors: Marcus Steen, Angered (SE); Svante Karlsson, Västra Frölunda (SE); Helene Panagopoulos, Göteborg (SE); Erik Lauri, Mölndal (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/424,403

(22) Filed: Jun. 15, 2006

(65) Prior Publication Data

US 2006/0223671 A1 Oct. 5, 2006

Related U.S. Application Data

(63) Continuation of application No. PCT/SE2005/000021, filed on Jan. 11, 2005.

(30) Foreign Application Priority Data

Jan. 14, 2004 (SE) .................................. 0400082

(51) Int. Cl.
*B60W 10/02* (2006.01)
*B60W 10/04* (2006.01)
(52) U.S. Cl. ........................................ 477/180; 701/68
(58) Field of Classification Search ................... 701/68
See application file for complete search history.

(56) References Cited

U.S. PATENT DOCUMENTS 5,014,832 A * 5/1991 Satoh et al. ............. 192/30 W
5,029,678 A * 7/1991 Koshizawa ................... 192/76
5,393,274 A 2/1995 Smedley
5,624,350 A 4/1997 Bates
2002/0038747 A1* 4/2002 Huschka et al. ......... 192/53.34

FOREIGN PATENT DOCUMENTS

| EP | 0725225 A1 | 8/1996 |
| WO | WO 0117815 A1 * | 3/2001 |
| WO | WO 03097400 A1 * | 11/2003 |
| WO | WO 03106212 A1 * | 12/2003 |

OTHER PUBLICATIONS

International Search Report for corresponding International Application PCT/SE2005/000021.

* cited by examiner

*Primary Examiner*—Sherry Estremsky
*Assistant Examiner*—Edwin A Young
(74) *Attorney, Agent, or Firm*—WRB-IP LLP

(57) ABSTRACT

A drive unit for a motor vehicle, comprising a drive engine, a transmission having an intermediate shaft with intermediate shaft brake, and a friction clutch which is engaged between the engine and the transmission and which, via an electronic control unit, is operated by an operating cylinder. A torque transmitter is provided, which detects input torque to the transmission. The control unit is arranged so as, on predetermined occasions, when the transmission is in the neutral position, the friction clutch is disconnected and the intermediate shaft brake is applied, gradually to engage the friction clutch and to register and store, as a function of the position the operating piston of the operating cylinder, the torque measured by the torque transmitter.

7 Claims, 2 Drawing Sheets

DRIVING UNIT FOR MOTOR VEHICLE AND METHOD FOR DETERMINING THE CHARACTERISTIC OF A COUPLING OF THE DRIVING UNIT

The present application is a continuation of International Application PCT/SE2005/000021, filed Jan. 11, 2005, which claims priority to SE 0400082-4, filed Jan. 14, 2002, both of which are incorporated by reference.

BACKGROUND AND SUMMARY

The present invention relates to a drive unit for a motor vehicle, comprising a drive engine with an output shaft, a transmission, which has an input shaft and at least one intermediate shaft with an intermediate shaft brake, a friction clutch with a first friction element connected to the output shaft and a second friction element connected to the input shaft, a clutch operating mechanism for engaging and disengaging the clutch, an electronic control unit for controlling the operating mechanism in dependence on various control parameters, and a position detector, which detects the position of the clutch operating mechanism and transmits a position-dependent signal to the control unit.

The invention also relates to a method for determining the torque-transmitting characteristic of a friction clutch which has a first friction element coupled to an output shaft from a drive engine and a second friction element coupled to an input shaft to a vehicle transmission, which transmission has an intermediate shaft with an intermediate shaft brake and a clutch operating mechanism, controlled by an electronic control unit, for regulating the engagement and disengagement of the clutch, the starting point for which method is that the engine is started, the transmission is in neutral position and the clutch is disconnected.

At present, a variety of methods are used to identify a so-called disconnection position of vehicle clutches. The clutch suppliers define where (expressed in terms of position of the clutch operating mechanism) the clutch is fully disconnected and does not transmit any torque. This position is defined with a safety margin, so that all clutches of a certain model will always with great certainty be fully disconnected, so that there is no risk of the clutch lying and slipping in the disconnected position and being subjected to unnecessary wear. For a typical clutch, this means that the clutch is controlled to a position lying unnecessarily far beyond the position in which the clutch torque is zero. This means, in turn, that the engagement process takes longer than if the process could be initiated from the position in which the torque becomes zero upon disconnection.

Correspondingly, there are a number of methods for determining the so-called traction position of the clutch, i. e. the position in which the clutch transmits a certain low torque. The traction position constitutes a reference point for controlling the movements of automated clutches where the gas pedal of the vehicle, for example during a starting process, acts as an pedal, which, when gas is applied from idle, increases the engagement of the clutch from the traction position to full engagement.

In a method for calculating the torque transmission of a vehicle clutch as a function of the position of the operating mechanism, which method is known by virtue of SE-A-517 743, the operating mechanism is put into a number of mutually different positions. The time from a predetermined low rev speed at the input shaft to a predetermined higher rev speed is measured for all chosen positions and the torques in the various engagement positions are calculated from the moment of inertia and the angular acceleration of the masses rotating in the neutral position of the transmission. A torque curve as a function of the position of the clutch operating mechanism can now be interpolated and/or extrapolated on the basis of the calculated torque values and, from this, the disconnection position and traction position can be determined with relatively high precision.

It is desirable to produce a drive unit of the type stated in the introduction, which, with simple means and absolute precision, can identify the disconnection position and traction position of a vehicle clutch.

This is achieved according to the invention by the fact that a torque transmitter is provided, which detects the torque at the input shaft and transmits a torque-dependent signal to the control unit, and that the control unit is arranged so as, on predetermined occasions, when the transmission is in the neutral position and the intermediate shaft brake is applied, gradually to alter the degree of engagement of the clutch and to register and store, as a function of the position of the clutch operating mechanism, the torque measured by the torque transmitter.

In a preferred embodiment, the control unit is arranged so as, when the clutch is disconnected and the intermediate shaft brake is applied, gradually to engage the clutch and to register and store, as a function of the position of the clutch operating mechanism, information on the torque measured by the torque transmitter.

It is desirable to produce a secure and simple method for determining, in a drive unit having a transmission with intermediate shaft brake, the torque-transmitting characteristic of the clutch of the drive unit.

This is achieved according to the invention by the fact that, with the engine started and the transmission in neutral position;
  the intermediate shaft brake is applied,
  the degree of engagement of the clutch is gradually altered,
  input torque to the transmission is detected, during the alteration, by means of a torque transmitter,
  the position of the clutch operating mechanism is detected, during the alteration, by means of a position detector, and
  the transmitted torque is stored in the control unit as a function of the position of the clutch mechanism.

The control unit can be programmed to conduct the described procedure for determining the torque characteristic of the clutch at certain set intervals or each time the engine is started. In this way, full control over changes in torque characteristic owing to plate wear, temperature changes, etc. is obtained, so that the clutch operating mechanism, upon disconnection, is always put into the position in which the torque becomes zero upon disconnection and, upon engagement, is put into the correct traction position. The procedure is concluded, at the latest, when the intermediate shaft brake is no longer capable of offering resistance to the clutch.

The invention also relates to a computer program and computer program product which comprise a program code according to the above-stated procedural steps.

BRIEF DESCRIPTION OF THE DRAWINGS

The invention is described in greater detail with reference to illustrative embodiments in the appended drawings, in which.

DETAILED DESCRIPTION

Figure 1:
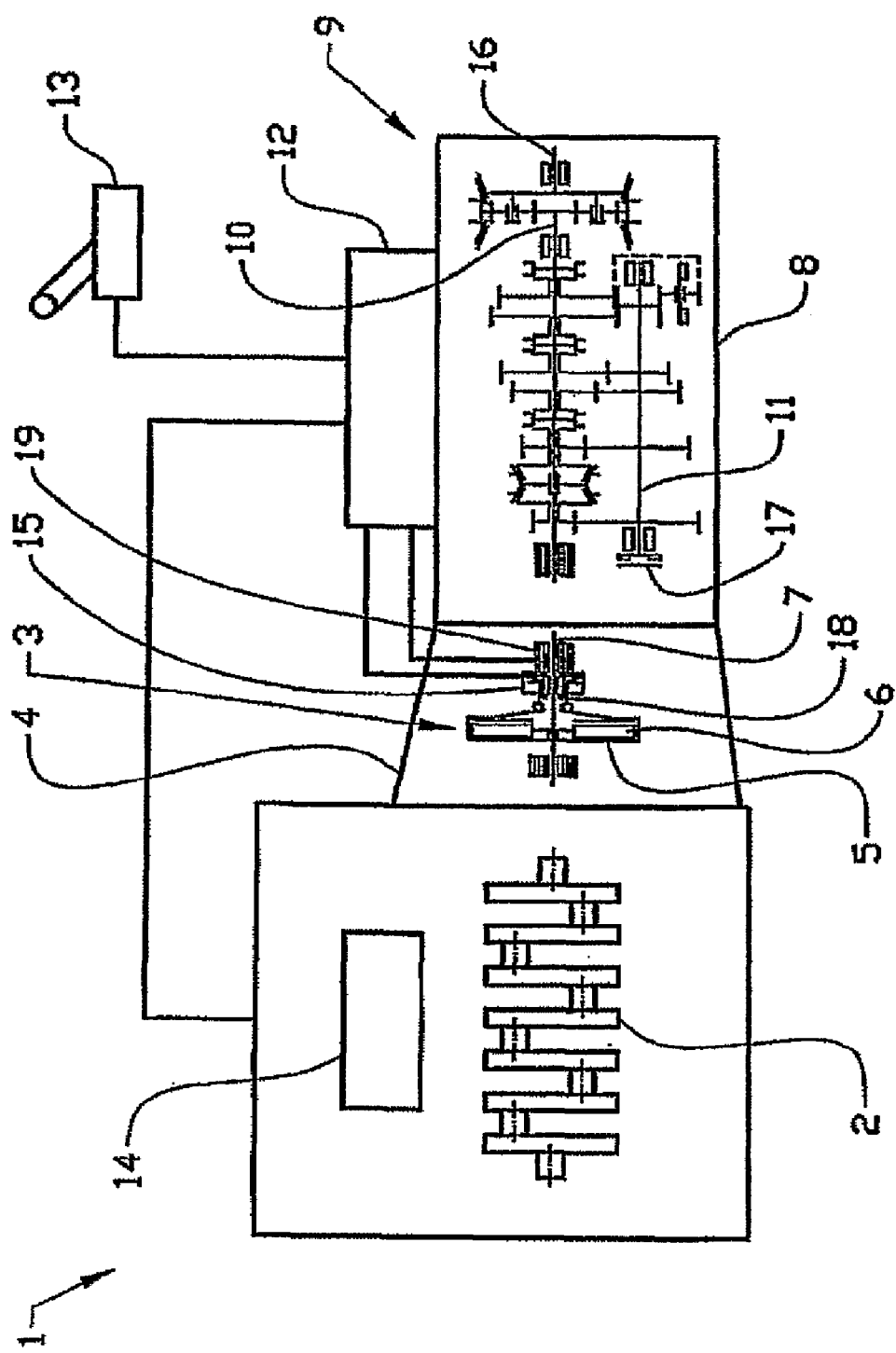
FIG. 1 shows a schematic representation of an embodiment of a drive unit according to the invention.

In FIG. 1, a six-cylinder internal combustion engine, for example a diesel engine, is denoted by 1, the crankshaft 2 of which is coupled to a single-disk dry plate clutch denoted generally by 3, which is enclosed in a clutch case 4. Instead of a single-disk plate clutch, a multi-disk clutch may be used. The crankshaft 2 is non-rotatably connected to the clutch housing 5 of the clutch 3, while the plate disk 6 thereof is non-rotatably connected to an input shaft 7, which is rotatably mounted in the housing 8 of a transmission denoted generally by 9. Rotatably mounted in the housing 8 are a main shaft 10 and an intermediate shaft 11.

The transmission is of a previously known type without in the basic transmission. Gearshifting is controlled by an electronic transmission control unit 12, comprising a microcomputer, in dependence on signals fed into the control unit and representing various engine and vehicle data, when a gear selector 13, coupled to the control unit, is in its automatic position. When the gear selector is in the manual gearshift position, the gearshifting is effected on command of the driver. The transmission control unit 12 communicates with an engine control unit 14 and, together therewith, also controls the fuel injection, i. e. the engine speed, in dependence on the gas pedal position and the supply of pressure medium to an operating cylinder, for example a pneumatic piston-cylinder device 15, by which the clutch 3 is engaged and disconnected.

The transmission control unit 12 is programmed in a known manner so that it keeps the clutch 3 engaged when the vehicle is stationary and the gear selector 13 is in the neutral position. This means that the engine drives the input shaft 7 and hence also the intermediate shaft 11, while the output shaft 16 of the transmission is disconnected. The control unit 12 is programmed, when the vehicle is stationary and the gear selector is moved from the neutral position to a gear position, either to the automatic position or to a position comprising a driver-selected start gear, firstly to disconnect the clutch 3 and then to brake the intermediate shaft 11 to a halt by use of a brake device 17, which is coordinated with the intermediate shaft and may be an intermediate shaft brake controlled by the control unit 12 in a manner which is known per se.

The piston-cylinder device 15 of the clutch, by which the clutch is engaged and disconnected, is coordinated with a position detector 18 which is known per se and which detects the position of the operating piston of the operating cylinder 15 and transmits a position-dependent signal to the transmission control unit 12. The input shaft 7 of the transmission is coordinated with a torque meter 19, which detects the torque transmitted from the engine via the clutch 3 to the input shaft 7 and delivers a signal to the transmission control unit, which signal is dependent on this torque.

Figure 2:
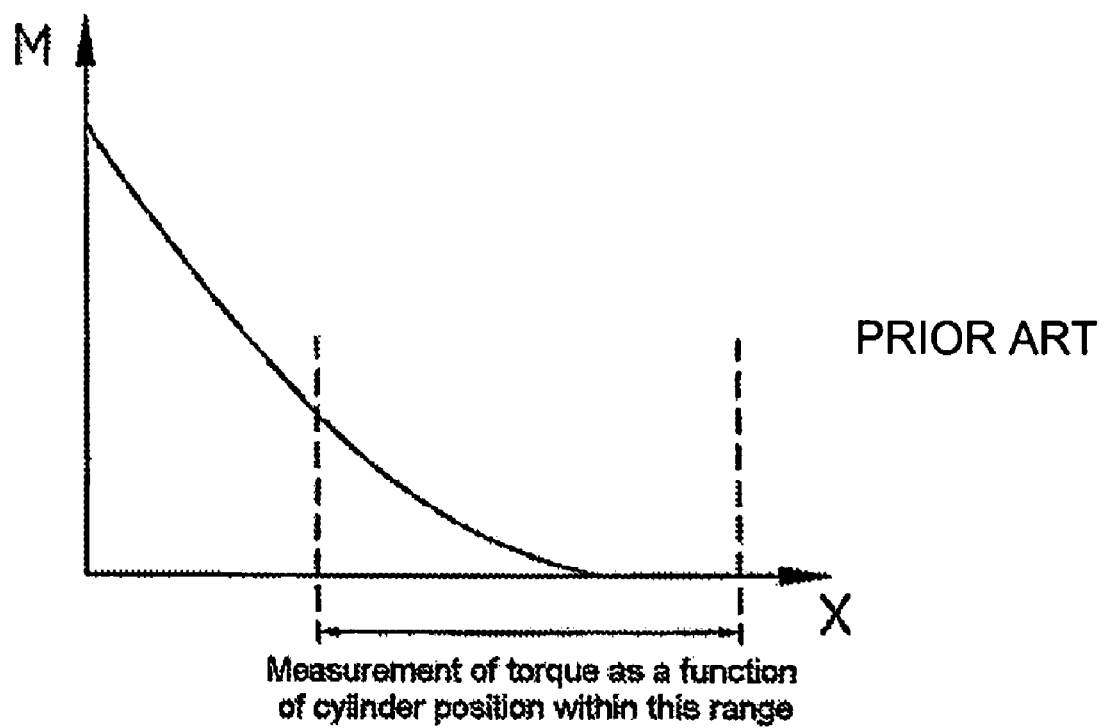
FIG. 2 shows a diagram illustrating a known method for calculating the torque characteristic of a vehicle clutch.
Figure 3:
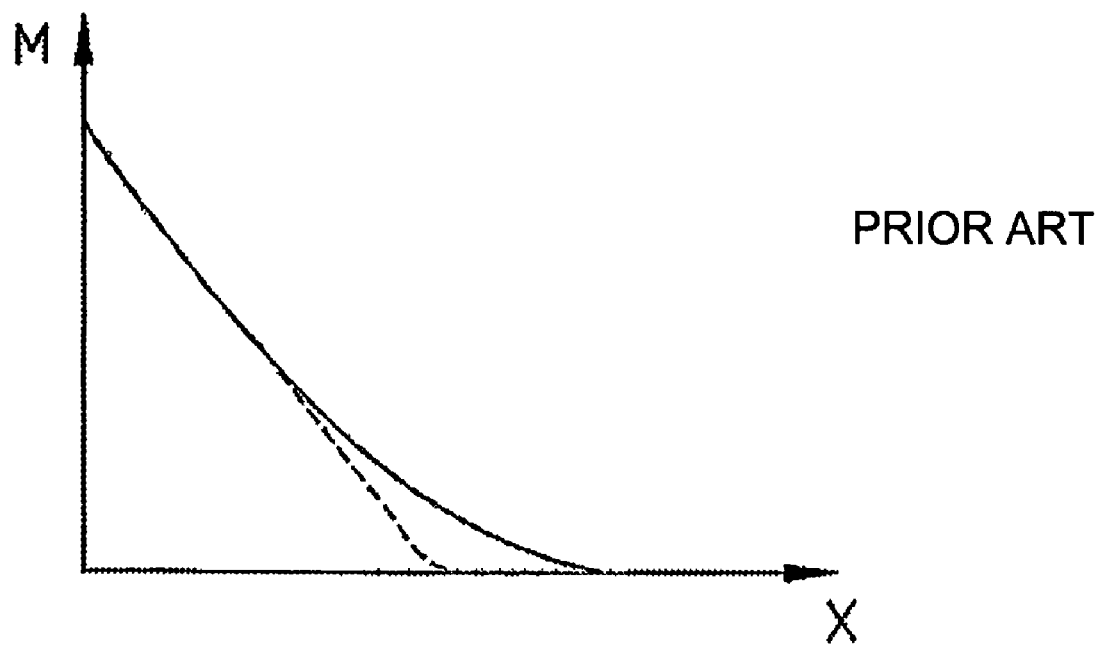
FIG. 3 shows a diagram illustrating the torque characteristic of two different clutches.

In FIG. 2, the chart illustrates a method, known according to SE-A-517 743, for calculating the relationship between the slip torque M of the clutch 3 and the position x of the cylinder 15, and FIG. 3 illustrates how the torque characteristic may vary between two different clutches of the same type.

According to the invention, the control unit 12 is in one embodiment programmed so as, on chosen occasions, when the engine is started, the transmission 9 is in its neutral position and the clutch 7 is engaged, firstly to disconnect the clutch and then to apply the intermediate shaft brake 17 and, with the intermediate shaft brake applied, gradually to engage the clutch 3. The control unit is programmed so as, during the engagement process, which expediently continues until the slip torque of the clutch 3 reaches the braking torque of the brake 17, to register and store in a table, as a function of the position of the operating cylinder 15 of the clutch 3, the torque measured by the torque transmitter 19. From this table, the traction position, i.e., that position of the operating cylinder in which the clutch, when engaged, gives a predetermined low slip torque, for example ca. 30 Nm, as well as the position where the torque becomes zero or almost zero upon disconnection, can be obtained.

Instead of registering increasing torque as the clutch is gradually engaged from zero, as has been described above, it is possible within the scope of the invention, in order to determine the torque-transmitting characteristic of the clutch, to conduct the procedure in reverse. Starting from an applied intermediate shaft brake and the clutch engaged to a certain predetermined degree of engagement, which produces a torque less than the braking torque of the brake, the degree of engagement is then gradually reduced, at the same time as the torque measured by the torque transmitter is registered and stored as a function of the position of the clutch operating mechanism.

A computer program according to the invention comprises a program code for, with a device disposed in the vehicle and in a predefined manner, applying the intermediate shaft brake 17, gradually altering the degree of engagement of the clutch, detecting input torque to the transmission 9 during the alteration by the use of a torque transmitter 19, detecting the position of the clutch operating mechanism during the alteration by the use of a position detector 18, and storing the transmitted torque in the control unit 12 as a function of the position of the clutch mechanism 15, when the program is executed by a data processor integrated in, for example, the control unit 12, or coupled to any of the control units of the vehicle.

The computer program according to the invention can be stored on a medium which is readable by a computer system integrated in the device. This medium can be, for example, a data diskette, a memory module, a CD or the like. This can be advantageous, for example, when the program is to be downloaded in the vehicle in production and/or when the program in the vehicle is to be updated. The updating of software can be carried out, for example, at scheduled services or, if so desired, directly by a customer. The updating of software can also be realized via a link-up, for example by internet, to a server in which the program is stored.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention should not be deemed to be limited to the illustrative embodiments described above, but rather a number of further variants and modifications are conceivable within the scope of the following patent claims.

What is claimed is:

1. A drive unit for a motor vehicle, comprising:
at least one drive engine with an output shaft;
a transmission, the transmission having an input shaft and at least one intermediate shaft with an intermediate shaft brake;
a friction clutch with a first friction element connected to the output shaft and a second friction element connected to the input shaft;
a clutch operating mechanism for engaging and disengaging the friction clutch;
an electronic control unit for controlling the clutch operating mechanism in dependence on various control parameters;
a position detector, the position detector detecting a position of the clutch operating mechanism and transmitting a position-dependent signal to the control unit;
a torque transmitter, the torque transmitter detecting torque at the input shaft and transmitting a torque-dependent signal to the control unit;
the control unit being arranged so as, on predetermined occasions, when the transmission is in a neutral position and the intermediate shaft brake is applied, gradually to alter a degree of engagement of the friction clutch and to register and store, as a function of the position of the clutch operating mechanism, the torque measured by the torque transmitter and to further alter engagement of the friction clutch as a function of the registered and stored torque.

2. The drive unit as claimed in claim 1, wherein the control unit is arranged so as, when the friction clutch is disconnected and the intermediate shaft brake is applied, gradually to engage the friction clutch and to register and store, as a function of the position of the clutch operating mechanism, the torque measured by the torque transmitter.

3. A method for determining a torque-transmitting characteristic of a friction clutch which has a first friction element coupled to an output shaft from at least one drive engine and a second friction element coupled to an input shaft to a vehicle transmission, which transmission has an intermediate shaft with an intermediate shaft brake and a clutch operating mechanism, controlled by an electronic control unit, for regulating engagement and disengagement of the friction clutch, the method, a starting point for which is that the drive engine is started and the transmission is in neutral position, comprising:

applying the intermediate shaft brake;
altering a degree of engagement of the friction clutch;
detecting input torque to the transmission, during alteration of the degree of engagement of the friction clutch, by a torque transmitter;
detecting a position of the clutch operating mechanism, during alteration of the degree of engagement of the friction clutch, by a position detector;
storing information corresponding to torque transmitted by the friction clutch as a function of a position of the clutch operating mechanism in the control unit; and
further altering engagement of the clutch as a function of the stored information.

4. The method as claimed in claim 3, wherein altering the degree of engagement of the friction clutch means, starting from a disconnected friction clutch and an applied intermediate shaft brake, gradually engaging the friction clutch.

5. A computer program in a computer for implementing the method as claimed in claim 3 when the computer program is executed on the computer.

6. A computer program product stored on a medium, readable by a computer, for implementing the method as claimed in claim 3 when the computer program is executed on the computer.

7. A computer program product stored on a medium readable by a computer and directly loadable into an internal memory in the computer, comprising a computer program for implementing the method as claimed in claim 3 when the computer program product is executed on the computer.

* * * * *